(12) United States Patent
Laflamme et al.

(10) Patent No.: US 11,591,165 B2
(45) Date of Patent: Feb. 28, 2023

(54) BELT CONVEYOR ROLLER WEAR LINER, BELT CONVEYOR ROLLER AND CONVEYOR INCLUDING SAME AND CORRESPONDING METHOD

(71) Applicant: TECHNOLOGIES ENDURIDE INC., Sept-Îles (CA)

(72) Inventors: Richard Laflamme, Québec (CA); David Boies, Levis (CA)

(73) Assignee: TECHNOLOGIES ENDURIDE INC., Sept-Iles (CA)

( * ) Notice: Subject to any disclaimer, the term of this patent is extended or adjusted under 35 U.S.C. 154(b) by 0 days.

(21) Appl. No.: 17/490,944

(22) Filed: Sep. 30, 2021

(65) Prior Publication Data

US 2022/0162010 A1  May 26, 2022

Related U.S. Application Data

(60) Provisional application No. 63/117,075, filed on Nov. 23, 2020.

(51) Int. Cl.
*B65G 39/06* (2006.01)
*B65G 15/42* (2006.01)
*B65G 23/04* (2006.01)

(52) U.S. Cl.
CPC ............. *B65G 39/06* (2013.01); *B65G 15/42* (2013.01); *B65G 23/04* (2013.01)

(58) Field of Classification Search
CPC ........ B65G 39/06; B65G 15/42; B65G 23/06; B65G 39/07; B29D 23/00
See application file for complete search history.

(56) References Cited

U.S. PATENT DOCUMENTS

| | | | | |
|---|---|---|---|---|
| 3,339,818 A | * | 9/1967 | Morrow | B65G 39/071 226/193 |
| 3,607,604 A | * | 9/1971 | Nava | B32B 5/16 174/650 |
| 3,607,606 A | | 9/1971 | Beninga | |
| 4,551,894 A | * | 11/1985 | Beucker | D21F 3/08 492/53 |
| 4,718,544 A | * | 1/1988 | Herren | B65G 39/07 474/191 |
| 4,761,317 A | * | 8/1988 | Ebata | B29C 37/0082 428/908.8 |

(Continued)

FOREIGN PATENT DOCUMENTS

| | | | |
|---|---|---|---|
| AU | 2343570 A | 6/1972 | |
| DE | 838718 C | 5/1952 | |
| KR | 10-20220060236 A * | 5/2022 | ............. B65G 23/04 |

*Primary Examiner* — Mark A Deuble
(74) *Attorney, Agent, or Firm* — BakerHostetler (57) ABSTRACT

The present disclosure concerns a belt conveyor roller wear liner superposable against an outer peripheral surface of a roller cylindrical body, the roller wear liner comprising: a shock-absorbing matrix; and a plurality of inserts, spaced-apart from one another and embedded in the shock-absorbing matrix with external surfaces of the inserts and the shock-absorbing matrix, extending between the inserts, being exposed outwardly, the roller wear liner being substantially ring-shaped. It also concerns a corresponding belt conveyor roller assembly, a corresponding belt conveyor and a corresponding method.

20 Claims, 10 Drawing Sheets

(56) References Cited

U.S. PATENT DOCUMENTS

| | | | | |
|---|---|---|---|---|
| 4,832,669 A | * | 5/1989 | Holz | B65G 39/07 |
| | | | | 474/191 |
| 4,855,174 A | * | 8/1989 | Kawamoto | B65D 90/06 |
| | | | | 198/957 |
| 6,082,527 A | | 7/2000 | Bruhmann et al. | |
| 6,143,404 A | * | 11/2000 | Bruhmann | F16D 69/025 |
| | | | | 428/407 |
| 6,168,544 B1 | * | 1/2001 | Barnes | F16H 55/38 |
| | | | | 474/190 |
| 6,692,392 B2 | | 2/2004 | Finnegan et al. | |
| D518,616 S | | 4/2006 | Goodwin | |
| 8,196,738 B1 | | 6/2012 | Wolf et al. | |
| 8,499,925 B2 | * | 8/2013 | Arimoto | B65H 27/00 |
| | | | | 198/835 |

* cited by examiner

BELT CONVEYOR ROLLER WEAR LINER, BELT CONVEYOR ROLLER AND CONVEYOR INCLUDING SAME AND CORRESPONDING METHOD

CROSS-REFERENCE TO RELATED APPLICATION

The present application claims priority from U.S. provisional patent application No. 63/117,075, filed on Nov. 23, 2020, and entitled "BELT CONVEYOR ROLLER AND CONVEYOR INCLUDING SAME", the disclosure of which being hereby incorporated by reference in its entirety.

TECHNICAL FIELD

The present invention relates to roller assemblies, and more specifically to roller assemblies comprising a wear liner for use in belt conveyors and the like, as well as to corresponding methods.

BACKGROUND

Belt conveyor rollers are designed for use on belt conveyors as means to drive, redirect, provide tension to, support, or help track a conveying belt thereof. Due to their permanent contact with an inner face of the conveying belt and the friction inbetween, the belt conveyor rollers might get quickly worn out and/or might wear the inner face of the conveying belt.

In view of the above, there is a need for a belt conveyor roller which would be able to overcome or at least minimize some of the above-discussed prior art concerns.

BRIEF SUMMARY

It is therefore an aim of the present invention to at least partially address the above-mentioned issues.

According to a general aspect, there is provided a belt conveyor roller wear liner superposable against an outer peripheral surface of a roller cylindrical body, the roller wear liner comprising: a shock-absorbing matrix; and a plurality of inserts, spaced-apart from one another and embedded in the shock-absorbing matrix with external surfaces of the inserts and the shock-absorbing matrix, extending between the inserts, being exposed outwardly, the roller wear liner being substantially ring-shaped.

According to another general aspect, there is provided a belt conveyor roller wear liner superposable against an outer peripheral surface of a belt conveyor roller cylindrical body, the roller wear liner comprising: a shock-absorbing matrix having a belt-facing face; and a plurality of inserts embedded in the shock-absorbing matrix and spaced-apart from one another, at least one of said plurality of inserts comprising: a belt-contacting face;

an opposed inner face; wherein the belt-contacting face of said at least one of said plurality of inserts and the belt-facing face of the shock-absorbing matrix define together a substantially continuous belt-contacting surface of the roller wear liner; and wherein a surface area of the belt-contacting face of said at least one of said plurality of inserts is smaller than or equal to a surface area of the corresponding inner face.

According to another general aspect, there is provided a belt conveyor roller wear liner superposable against an outer peripheral surface of a roller cylindrical body, the roller wear liner comprising: a shock-absorbing matrix having a belt-facing face; and a plurality of inserts, spaced-apart from one another and embedded in the shock-absorbing matrix, each of the plurality of inserts having a belt-contacting face; wherein the belt-contacting faces of the plurality of inserts and the belt-facing face of the shock-absorbing matrix form together a substantially continuous belt-contacting surface of the roller wear liner; and wherein the roller wear liner is substantially ring-shaped and extends partially along less than about 50% of a length of the roller cylindrical body when superposed against the outer peripheral surface of the roller cylindrical body.

According to another general aspect, there is provided a belt conveyor roller wear liner superposable against an outer peripheral surface of a roller cylindrical body, the roller wear liner comprising: a polyurethane matrix; and a plurality of inserts, spaced-apart from one another and embedded in the polyurethane matrix with external surfaces of the inserts and the polyurethane matrix, extending between the inserts, being exposed outwardly.

According to another general aspect, there is provided a belt conveyor roller wear liner superposable against an outer peripheral surface of a belt conveyor roller cylindrical core, the roller wear liner comprising: a shock-absorbing matrix; and a plurality of inserts embedded in the shock-absorbing matrix, each one of said inserts having a perimeter and comprising: a belt-contacting face; an opposed inner face; and a peripheral wall extending between the belt-contacting and inner faces; a retention groove being formed in the peripheral wall and extending along at least a portion of the perimeter.

According to another general aspect, there is provided a belt conveyor roller assembly comprising: a roller cylindrical body having an outer peripheral surface; and at least one roller wear liner according to the present disclosure, said at least one roller wear liner being superposed against the outer peripheral surface of the roller cylindrical body.

According to another general aspect, there is provided a belt conveyor roller assembly, comprising: a roller cylindrical body having an outer peripheral surface; and at least two roller wear liners according to the present disclosure, said roller wear liners being superposed against the outer peripheral surface of the roller cylindrical body.

According to yet another aspect, there is provided a belt conveyor comprising: a conveying belt; and a plurality of rollers surrounded by the conveying belt, wherein at least one of the rollers comprises a roller wear liner according to the present disclosure.

According to another general aspect, there is provided a method for manufacturing a belt conveyor roller wear liner, comprising: providing a wear liner mat and a plurality of inserts, each of the plurality of inserts comprising a belt-contacting face and an opposed inner face; securing the inner faces of the plurality of inserts to the wear liner mat, the plurality of inserts being spaced apart from each other; placing the wear liner mat with the plurality of inserts secured thereto in a mold; and injecting a shock-absorbing material in the mold to form the roller wear liner comprising a shock-absorbing matrix embedding the plurality of spaced-apart inserts; wherein the belt-contacting faces of the plurality of inserts are exposed outwardly when the roller wear liner is removed from the mold.

DETAILED DESCRIPTION

In the following description, the same numerical references refer to similar elements. Furthermore, for the sake of simplicity and clarity, namely so as to not unduly burden the figures with several references numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures are optional and are given for exemplification purposes only.

Moreover, it will be appreciated that positional descriptions such as "above", "below", "forward", "rearward", "left", "right" and the like should, unless otherwise indicated, be taken in the context of the figures only and should not be considered limiting. Moreover, the figures are meant to be illustrative of certain characteristics of the belt conveyor pulley assembly (or belt conveyor roller assembly) and are not necessarily to scale.

To provide a more concise description, some of the quantitative expressions given herein may be qualified with the term "about". It is understood that whether the term "about" is used explicitly or not, every quantity given herein is meant to refer to an actual given value, and it is also meant to refer to the approximation to such given value that would reasonably be inferred based on the ordinary skill in the art, including approximations due to the experimental and/or measurement conditions for such given value.

In the following description, an embodiment is an example or implementation. The various appearances of "one embodiment", "an embodiment" or "some embodiments" do not necessarily all refer to the same embodiments. Although various features may be described in the context of a single embodiment, the features may also be provided separately or in any suitable combination. Conversely, although the invention may be described herein in the context of separate embodiments for clarity, it may also be implemented in a single embodiment. Reference in the specification to "some embodiments", "an embodiment", "one embodiment" or "other embodiments" means that a particular feature, structure, or characteristic described in connection with the embodiments is included in at least some embodiments, but not necessarily all embodiments.

It is to be understood that the phraseology and terminology employed herein is not to be construed as limiting and are for descriptive purpose only. The principles and uses of the teachings of the present disclosure may be better understood with reference to the accompanying description, figures and examples. It is to be understood that the details set forth herein do not construe a limitation to an application of the disclosure.

Furthermore, it is to be understood that the disclosure can be carried out or practiced in various ways and that the disclosure can be implemented in embodiments other than the ones outlined in the description above. It is to be understood that the terms "including", "comprising", and grammatical variants thereof do not preclude the addition of one or more components, features, steps, or integers or groups thereof and that the terms are to be construed as specifying components, features, steps or integers. If the specification or claims refer to "an additional" element, that does not preclude there being more than one of the additional element. It is to be understood that where the claims or specification refer to "a" or "an" element, such reference does not mean that there is only one of that element. It is to be understood that where the specification states that a component, feature, structure, or characteristic "may", "might", "can" or "could" be included, that particular component, feature, structure, or characteristic is not required to be included.

The descriptions, examples, methods and materials presented in the claims and the specification are not to be construed as limiting but rather as illustrative only. Meanings of technical and scientific terms used herein are to be commonly understood as by one of ordinary skill in the art to which the invention belongs, unless otherwise defined. It will be appreciated that the methods described herein may be performed in the described order, or in any suitable order.

Figure 1:
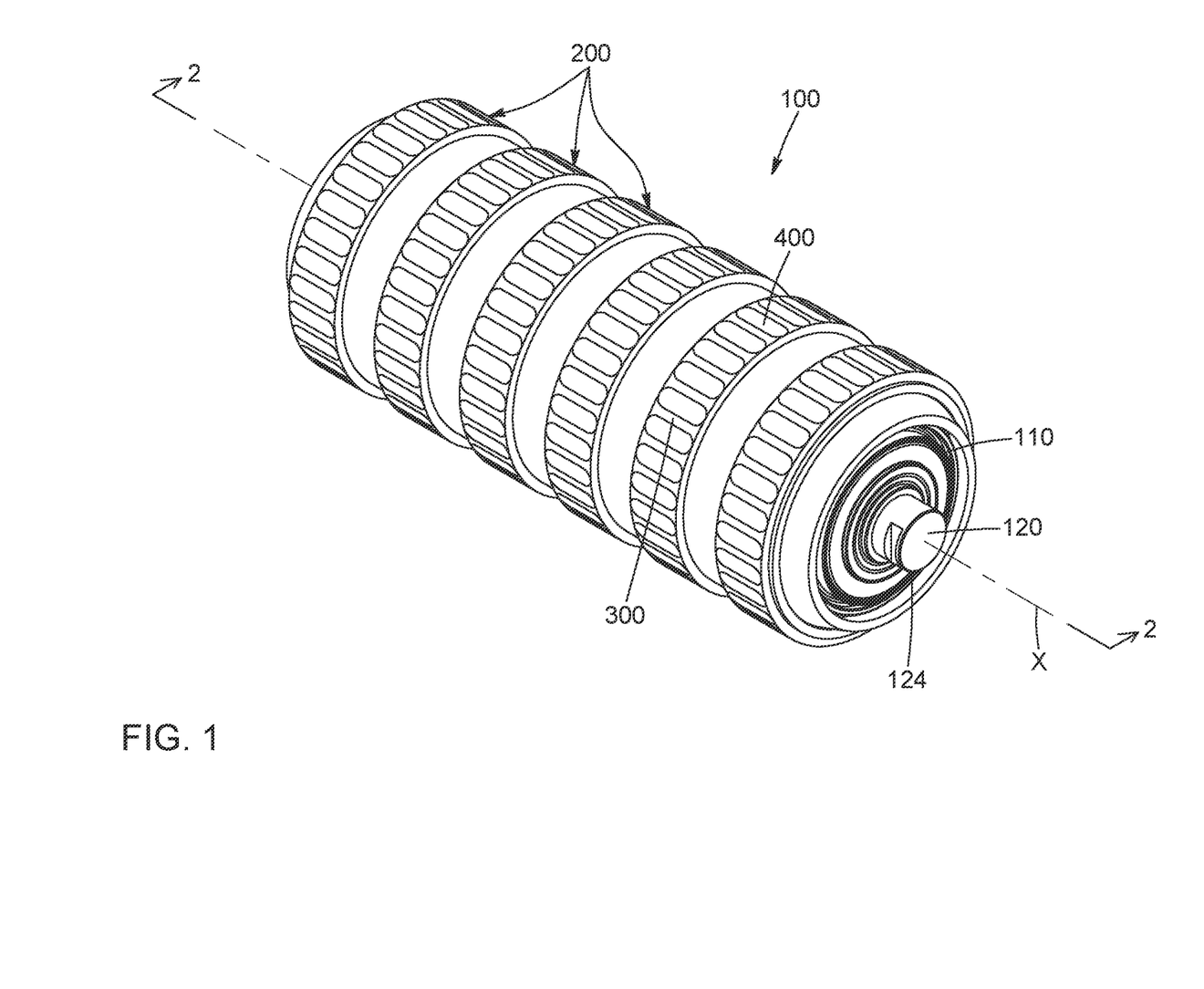
FIG. 1 is a perspective view of a belt conveyor roller assembly comprising a roller cylindrical body and a plurality of roller wear liners in accordance with a first embodiment, the roller wear liners being superposed against an outer peripheral surface of the roller cylindrical body and comprising a plurality of inserts embedded in a shock-absorbing matrix.
Figure 2:
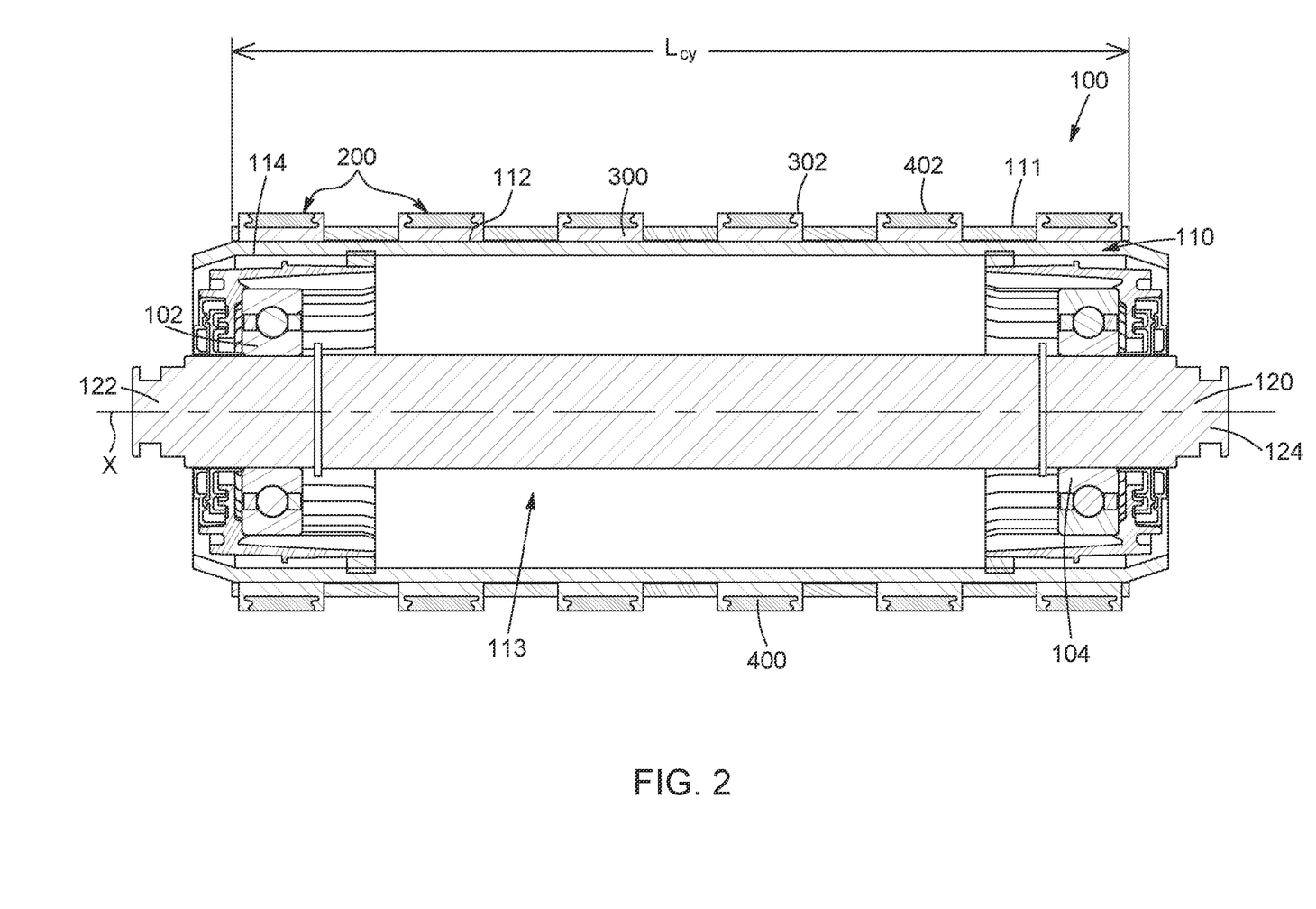
FIG. 2 is a cross-section view of the belt conveyor roller assembly of FIG. 1 taken along cross-section lines 2-2 of FIG. 1.

Referring now to the drawings, and more particularly to FIGS. 1 and 2, there is shown a belt conveyor roller assembly 100 comprising a roller cylindrical body 110 (or roller cylindrical core 110) and a plurality of roller wear liners 200 in accordance with a first embodiment.

Figure 12:
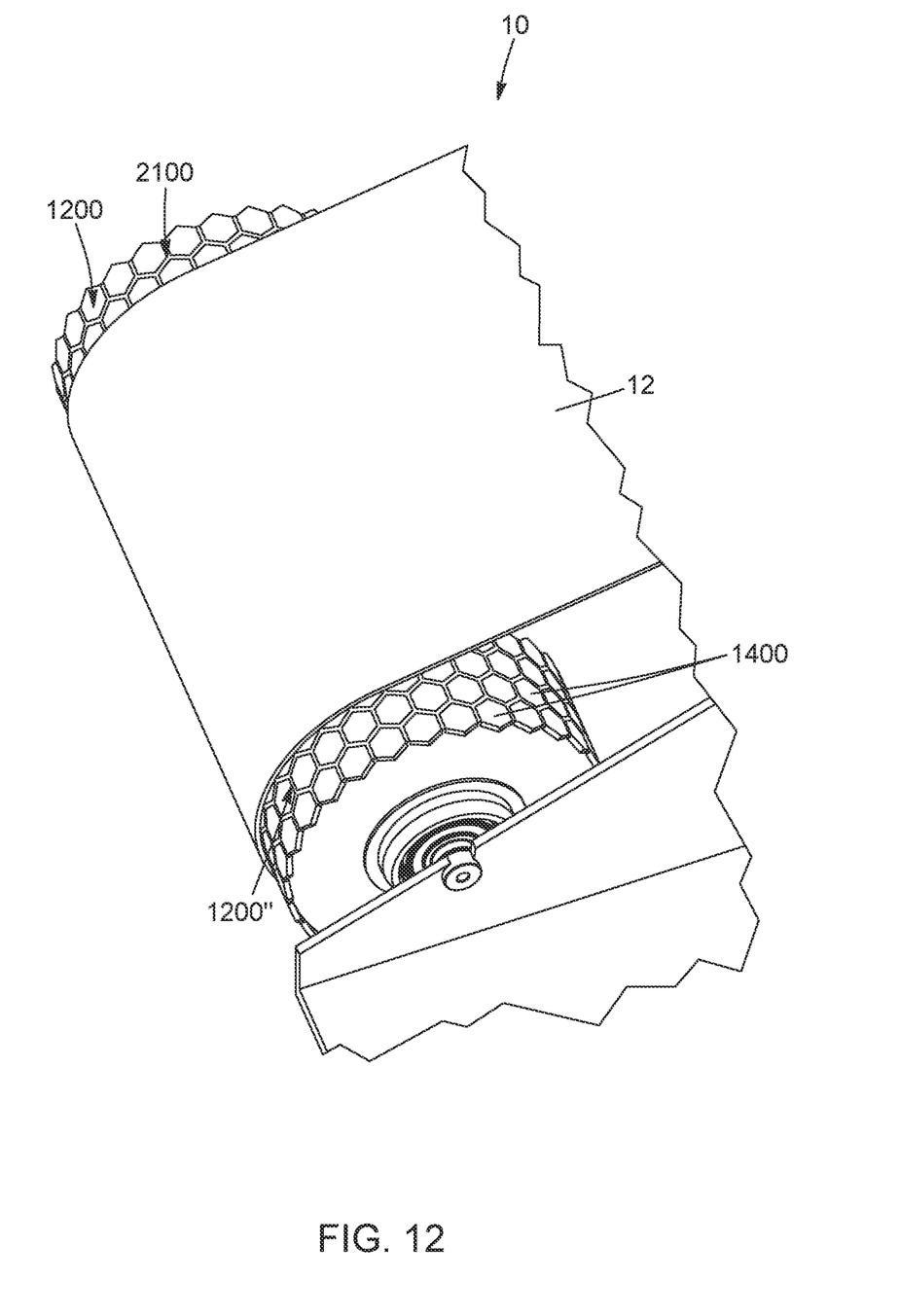
FIG. 12 is a belt conveyor comprising a conveying belt and the belt conveyor roller assembly of FIG. 11, wherein the belt conveyor roller assembly is at least partially surrounded by the conveying belt.

The belt conveyor roller assembly is for instance for use in a belt conveyor 10 as the one represented in FIG. 12, wherein the belt conveyor 10 comprises a belt 12 (or conveying belt 12) and a plurality of rollers, with some of them being pulleys (either head or tail pulleys), surrounded by the conveying belt 12 and being in contact with an inner face of the conveying belt 12. One or more of the rollers comprises a belt conveyor roller assembly 2100 in accordance with the present disclosure comprising one or more roller wear liners 1200, 1200".

The roller assembly could also be used in other conveyors such as, for instance, slat conveyors, apron conveyors, powered roller conveyors and the like. It is also understood that the belt conveyor roller assembly (or belt conveyor pulley assembly) can be an idler roller (or supporting roller) or a driving roller (or driving pulley or drive pulley or head pulley or a tail pulley). It is known that an idler pulley or idler roller is any roller used in a non-drive position that is intended to rotate freely and be driven by the belt. The idler roller can be, for instance, a return (or tail) pulley, a snub roller, a take-up roller or a bend roller. A driving roller (or driving pulley) is a conveyor pulley used for the purpose of driving the conveying belt. The driving roller is usually mountable in external bearings and can be driven by an external drive source (or external actuator).

In the following description, the terms "roller" and "pulley" will indifferently be used. In the context of the present description, the expression "roller" or "pulley" includes different types of devices that can be used according to the present invention. Moreover, although the present invention was primarily designed for use in conveyors and the like, it will be appreciated that it could be used in other applications.

In accordance with the present disclosure, referring back to FIGS. 1 and 2, the belt conveyor roller wear liner 200 is superposable against an outer peripheral surface 112 of the roller cylindrical core 110 (or roller cylindrical body 110). As detailed below, the roller wear liner 200 comprises a shock-absorbing matrix 300 and a plurality of inserts 400, spaced-apart from one another and embedded in the shock-absorbing matrix 300 with external faces 402, 302 (or belt-contacting faces 402, 302 or belt-facing faces 402, 302) of the inserts 400 and the shock-absorbing matrix 300, extending between the inserts 400, being exposed outwardly.

Belt Conveyor Roller Assembly

As best shown in FIGS. 1 and 2, the belt conveyor roller assembly 100 has a roller shaft 120 having a longitudinal axis X and extending along the roller cylindrical core 110. The roller shaft 120 has opposed first and second longitudinal end portions 122, 124 to mount the roller shaft to a conveyor frame (not represented), the roller cylindrical core 110 being rotated about the longitudinal axis X upon cooperation thereof with the inner face of the conveying belt 12 (FIG. 12).

The roller cylindrical core 110 extends along the longitudinal axis X and the belt conveyor roller assembly 100 further comprises first and second bearings 102, 104 arranged between an inner face 114 of the roller cylindrical core 110 and the corresponding one of the first and second longitudinal end portions 122, 124 of the roller shaft 120.

In the embodiment shown, the roller assembly 100 is of the drum style type, wherein a contact face 111 (FIG. 2) (or belt-contacting face 111) of the roller assembly 100 is at least partially constructed from the cylindrical core 110 (or cylindrical shell or cylindrical tube). Drum style pulleys or rollers are commonly found in all positions of a belt conveyor.

It is appreciated that the shape and the configuration of the belt conveyor roller assembly 100 can vary from the embodiment shown.

Belt Conveyor Roller Wear Liner

In the embodiment shown, the belt conveyor roller wear liners 200 of the belt conveyor roller assembly 100 have a similar shape, so that the following description of one of the belt conveyor roller wear liners 200 will apply to any of them. It could also be conceived a belt conveyor roller assembly 100 with roller wear liners having different shapes and/or components superposed against and/or mounted to the outer peripheral surface of the roller cylindrical core thereof.

As best shown in FIGS. 3 to 7, the belt conveyor roller wear liner 200 has a central axis X corresponding to (or in register with) the longitudinal axis of the roller assembly 100 when superposed against and/or mounted to the outer peripheral surface 112 of the roller cylindrical core 110 thereof.

Figure 3:
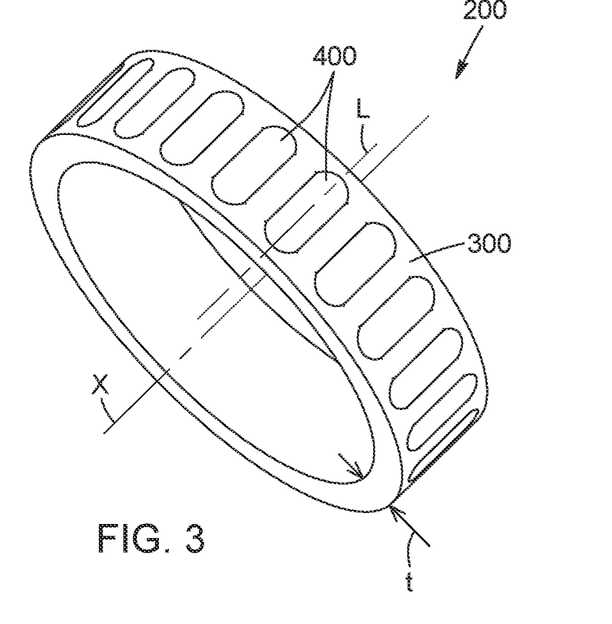
FIG. 3 is a perspective view of one of the roller wear liners of the belt conveyor roller assembly of FIG. 1.

In the embodiment shown, the belt conveyor roller wear liner 200 is substantially ring-shaped and is single-pieced. In other words, considered in a plane substantially perpendicular to the longitudinal axis of the roller cylindrical body, the roller wear liner is superposable against an entirety of the outer peripheral surface of the roller cylindrical body. It could also be conceived a roller wear liner that would comprise a plurality of ring segments secured to each other.

Shock-Absorbing Matrix

In the embodiment shown the shock-absorbing matrix 300 is at least partially formed of a polymeric-based material, such as, for instance and without being limitative, polyurethane. It could also be conceived a polymeric-based matrix that would at least partially be formed of any other material having resilience properties and/or shock-absorbing properties, such as visco-elastic polymer shock-absorbing polymer, visco-elastic polymer, visco polymer, rubber, neoprene, silicone and the like.

For instance, the shock-absorbing matrix 300 is made in a matrix material having a matrix hardness comprised between about 50 shore A and about 125 shore A. In another embodiment, the matrix hardness is comprised between about 75 shore A and about 100 shore A. In another example, the matrix hardness is comprised between about 80 shore A and about 95 shore A.

Insert

In the embodiment shown, the inserts 400 of the roller wear liner 200 have a similar shape, so that the following description of one of the inserts will apply to any of them.

Figure 8:
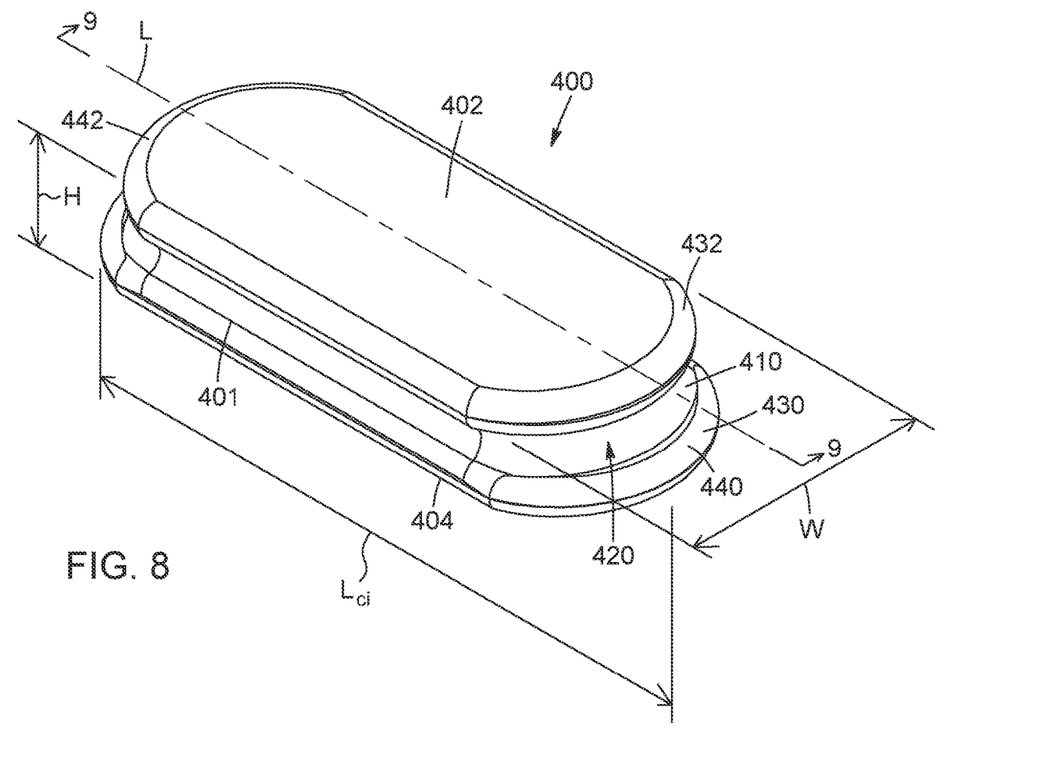
FIG. 8 is a perspective view of one of the inserts of the roller wear liner of FIG. 3.
Figure 9:
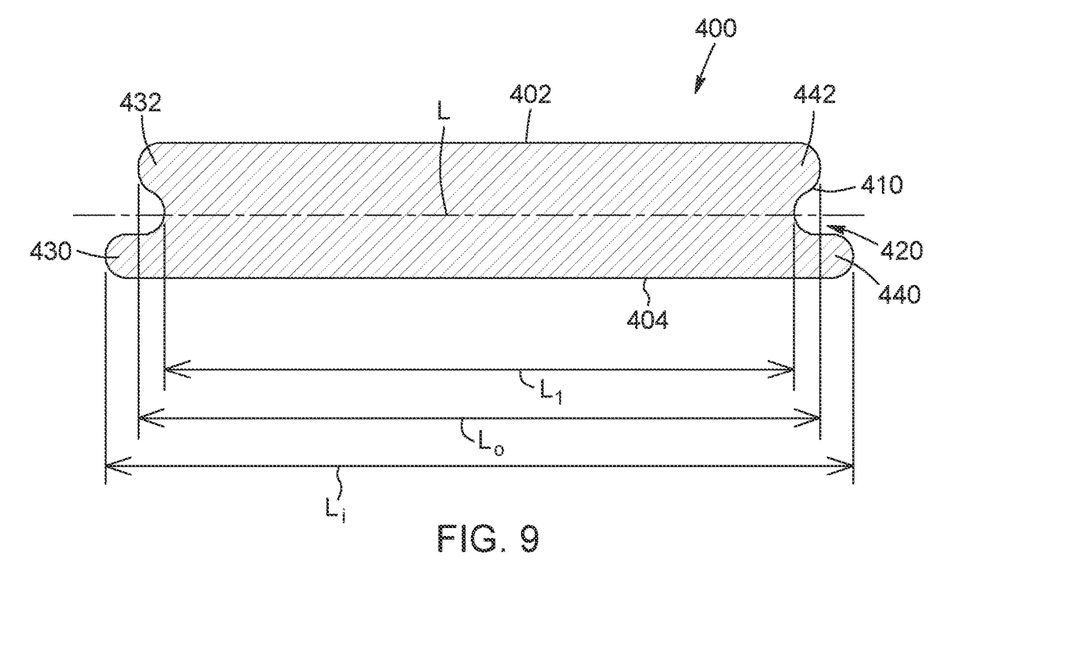
FIG. 9 is a cross-section view of the insert of FIG. 8 taken along cross-section lines 9-9 of FIG. 8.

As best shown in FIGS. 8 and 9, the insert 400 has a perimeter 401 and comprises the above-mentioned belt-contacting face 402 (or outer face 402) and an opposed inner face 404. In the present description, the terms inner and outer should be understood, unless otherwise stated, with respect to an inner cavity 113 of the roller cylindrical core 110 of the roller assembly 100 when the roller wear liner 200 is superposed against the outer surface 112 thereof or with respect to the longitudinal axis X of the roller shaft 120.

The insert 400 further comprises a peripheral wall 410 extending between the belt-contacting and inner faces 402, 404. In the embodiment shown, a retention groove 420 is formed in the peripheral wall 410 and extends along at least a portion of the perimeter 401 of the insert 400.

In the embodiment shown, at least one of the belt-contacting and inner faces 402, 404 is substantially planar.

In the embodiment shown, the belt-contacting and inner faces 402, 404 are substantially parallel to each other.

A surface area of the belt-contacting face 402 is smaller than or equal to a surface area of the inner face 404. In some embodiments, the surface area of the belt-contacting face 402 is substantially equal to the surface area of the inner face 404. In another embodiment, the surface area of the belt-contacting face 402 is smaller than about 99% of the surface area of the inner face 404. In another embodiment, the surface area of the belt-contacting face 402 is smaller than about 97% of the surface area of the inner face 404. In another embodiment, the surface area of the belt-contacting face 402 is smaller than about 95% of the surface area of the inner face 404. In another embodiment, the surface area of the belt-contacting face 402 is smaller than about 90% of the surface area of the inner face 404. In yet another embodiment, the surface area of the belt-contacting face 402 is smaller than about 80% of the surface area of the inner face 404.

In the embodiment shown, at least one of the belt-contacting and inner faces 402, 404 has a substantially oval shape and, more particularly, obround.

As best shown in FIG. 8, a profile of each of the belt-contacting and inner faces 402, 404 of the insert 400 has substantially straight lateral edges, substantially parallel to each other, and first and second curved portions extending between first and second longitudinal ends of the lateral edges. Any other shape of the belt-contacting and inner faces could also be conceived.

In the embodiment shown, the retention groove 420 has a substantially curved profile. For instance, the retention groove 420 defines a concavity in the peripheral wall 410.

In the embodiment shown, inner and outer shoulders 430, 432 are formed respectively on the inner and belt-contacting faces 404, 402 and are located on a respective side of the retention groove 420. For instance, the inner and outer shoulders 430, 432 have a curved profile and extend along substantially an entirety of the perimeter 401 of the insert 400. For instance, the inner and outer shoulders 430, 432 comprise respectively inner and outer convexities 440, 442. In other words, the inner and outer convexities 440, 442 are formed respectively between the inner and outer faces 404, 402 and the retention groove 420.

In the embodiment shown, the insert 400 extends along a longitudinal direction L. In the embodiment shown, the longitudinal direction L is substantially parallel to the central axis X of the roller wear liner 200, when mounted thereto (i.e., substantially parallel to the longitudinal axis of the roller assembly 100 when superpose against and/or mounted to the outer peripheral surface of the roller cylindrical core thereof). Considered in a plane extending along the longitudinal direction L of the insert 400, as represented in FIG. 9, a minimal length L1 of the insert 400 is less than about 95% of at least one of an outer length Lo of the belt-contacting face 402 and an inner length Li of the inner face 404. For instance, the minimal length L1 of the insert 400 corresponds to a bottom end of the retention groove 420. In other words, the minimal length L1 of the insert 400 corresponds to a distance between the bottom of the concavities of the retention groove 420 along the longitudinal direction L.

For instance, a bending radius of the concavity of the retention groove 420 is substantially equal to a bending radius of at least one of the inner and outer convexities 440, 442. In the embodiment shown, the bending radius of the concavity of the retention groove 420 is substantially equal to the bending radius of the inner and outer convexities 440, 442.

For instance, the retention groove 420 extends along at least about 50% of the perimeter 401 of the insert 400. In another embodiment, the retention groove 420 extends along at least about 75% of the perimeter 401. In yet another example, the retention groove 420 extends along substantially an entirety of the perimeter 401 of the insert 400.

In the embodiment shown, the insert 400 is at least partially formed in an insert material having an insert hardness greater than a hardness of a material (for instance silica and the like) conveyed by the belt conveyor 10 equipped with the roller wear liner 200, so that the roller wear liner 200 would substantially wear the conveyed material that would get incrusted into an inner face of the conveying belt. For instance, the insert hardness (measured for instance using the Vickers hardness test) is comprised between about 500 HV (Vickers Pyramid Number) and about 3000 HV. In another embodiment, the insert hardness is comprised between about 1000 HV and about 2000 HV. For instance, the insert 400 is at least partially made of an abrasion-resisting material such as, for instance and without being limitative, ceramic. For instance, the insert 400 is at least partially made of a material comprising more than about 50% of $Al_2O_3$. In another embodiment, the insert 400 is at least partially made of a material comprising more than about 75% of $Al_2O_3$. In another embodiment, the insert 400 is at least partially made of a material comprising more than about 90% of $Al_2O_3$. In another embodiment, the insert 400 is at least partially formed of at least one of tungsten carbide, chromium carbide, or a combination thereof.

In another embodiment, it could be conceived a roller wear liner wherein at least one of the inserts thereof is made in an insert material having an insert hardness inferior to the matrix hardness of the material forming at least partially the shock-absorbing matrix 300 (and than the hardness of the conveyed material) so that the conveyed material that would be between the inner face of the conveying belt and the roller wear liner would incrust the insert.

As represented in FIG. 8, the insert 400 has a length Lci (corresponding to the length Li of the inner face 404 thereof), a width W (considered in a direction substantially perpendicular to the longitudinal direction L) and a height H (corresponding substantially to a distance between the inner and outer faces 404, 402).

In the embodiment shown, the length Lci of the insert 400 is comprised between about 0.5 cm and about 10 cm. In another embodiment, the length Lci is comprised between about 1 cm and about 7 cm. In another embodiment, the length Lci is comprised between about 2 cm and about 5 cm. In another embodiment, the length Lci is comprised between about 3 cm and about 4 cm. In yet another embodiment, the length Lci is about 3.5 cm.

In the embodiment shown, the width W of the insert 400 is comprised between about 0.5 cm and about 7 cm. In another embodiment, the width W is comprised between about 0.5 cm and about 5 cm. In another embodiment, the width W is comprised between about 1 cm and about 2 cm. In yet another embodiment, the width W is about 1.5 cm.

In the embodiment shown, the height H of the insert 400 is comprised between about 0.2 cm and 3 cm. In another embodiment, the height H is comprised between about 0.2 cm and about 1.5 cm. In another embodiment, the height H is comprised between about 0.4 cm and about 0.8 cm. In yet another embodiment, the height H is comprised between about 0.6 cm and about 0.7 cm.

It is appreciated that the shape, the configuration, the dimensions and the composition of the insert can vary from the embodiment shown. It could also be conceived a roller wear liner when at least some of the inserts thereof would have different shapes, dimensions and/or properties (for instance hardness).

Figure 11:
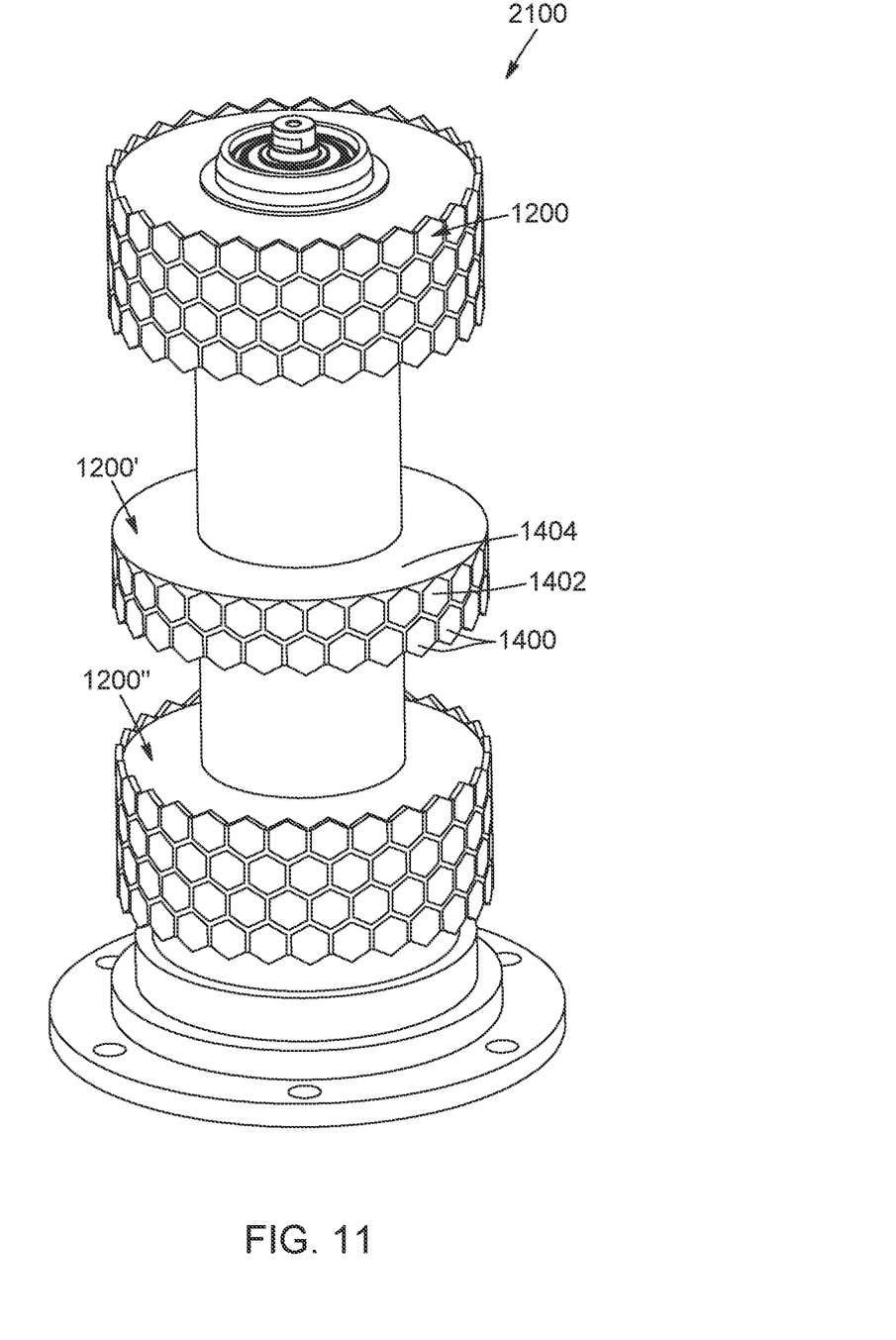
FIG. 11 is a perspective view of a belt conveyor roller assembly in accordance with a third embodiment, the belt conveyor assembly comprising a plurality of roller wear liners in accordance with another embodiment, the inserts of the roller wear liners having a substantially hexagonal shape.

For instance, as represented in FIGS. 11 and 12, it could be conceived a belt conveyor roller assembly 2100 comprising a plurality of belt conveyor roller wear liners 1200, 1200', 1200" with inserts 1400 with belt-contacting and inner faces 1402, 1404 having a substantially hexagonal shape. For instance, at least one of the plurality of inserts 1400 of the roller wear liners 1200, 1200', 1200" has a retention groove being formed in a peripheral wall extending between the belt-contacting and inner faces 1402, 1404. For instance, at least one of the inserts 1400 is shaped and dimensioned so that a surface area of the belt-contacting face is smaller than or equal to a surface area of the inner face.

Relative Arrangement of the Inserts and the Shock-Absorbing Matrix

Figure 4:
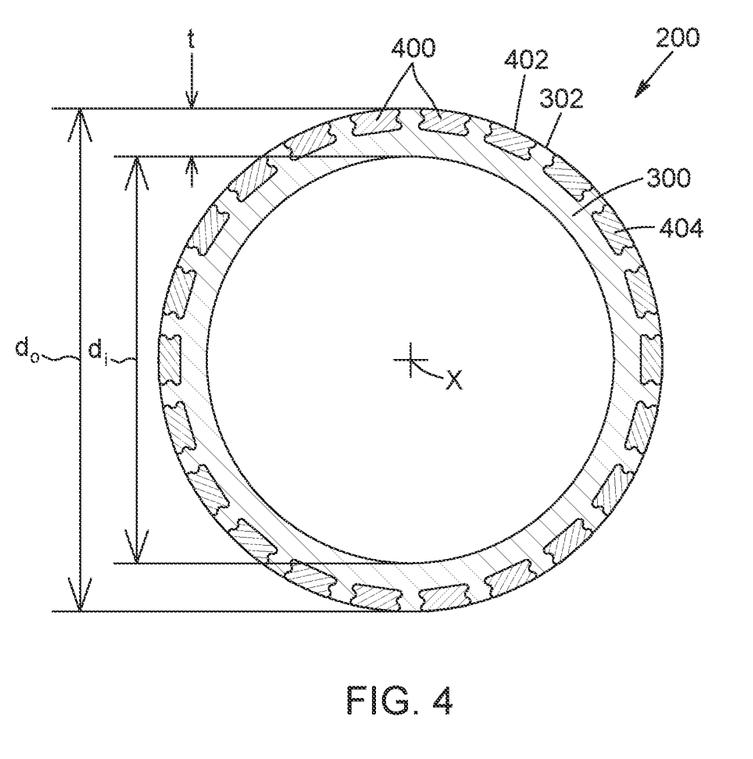
FIG. 4 is a cross-section view of the roller wear liner of FIG. 3, considered in a plane substantially perpendicular to a central axis of the roller wear liner.
Figure 5:
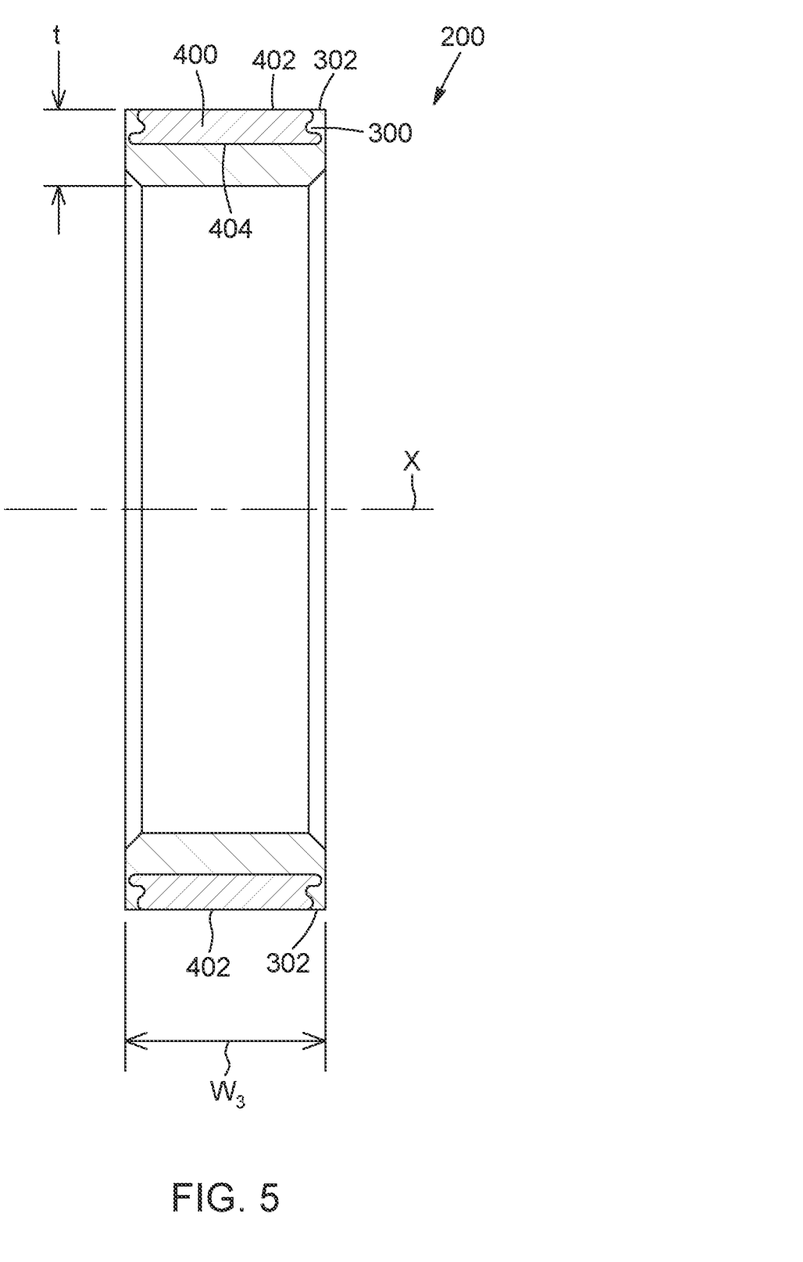
FIG. 5 is a cross-section view of the roller wear liner of FIG. 3, considered in a plane comprising the central axis of the roller wear liner.

In the embodiment shown, as represented in FIGS. 4 and 5, the inserts 400 are embedded in the shock-absorbing matrix 300 so that the outer face 402 (or belt-contacting face 402) of the insert 400 and the belt-face face 302 (or outer face 302) of the matrix 300 (i.e. the portions of the shock-absorbing matrix 300 extending between adjacent inserts 400) define together a substantially continuous belt-contacting surface of the roller wear liner 200. In other words, the belt-contacting face 402 of the insert 400 is substantially at a same level as the belt-facing face 302 of the surrounding portion of the matrix 300. In yet other words, the belt-contacting face 402 of the insert 400 and the belt-facing face 302 (or belt-contacting face 302) of the matrix 300 (at least the portion thereof surrounding the insert 400) are substantially aligned with each other. In some embodiments, the insert 400 slightly protrudes from the matrix 300. In other words, a space between adjacent inserts 400 of the roller wear liner 200 is substantially completely filled with the shock-absorbing matrix 300. In the embodiment shown, the outer faces 402 of the inserts form at least about 50% of an outer surface area of the roller wear liner. In some embodiments, the outer faces 402 of the inserts form at least about 70% of the outer surface area of the roller wear liner. In some other embodiments, the outer faces 402 of the inserts form at least about 90% of the outer surface area of the roller wear liner.

It could alternatively be conceived a roller wear liner wherein the belt-contacting face of the insert would protrude outwardly from the belt-contacting face (or outer face) of the matrix.

Figure 6:
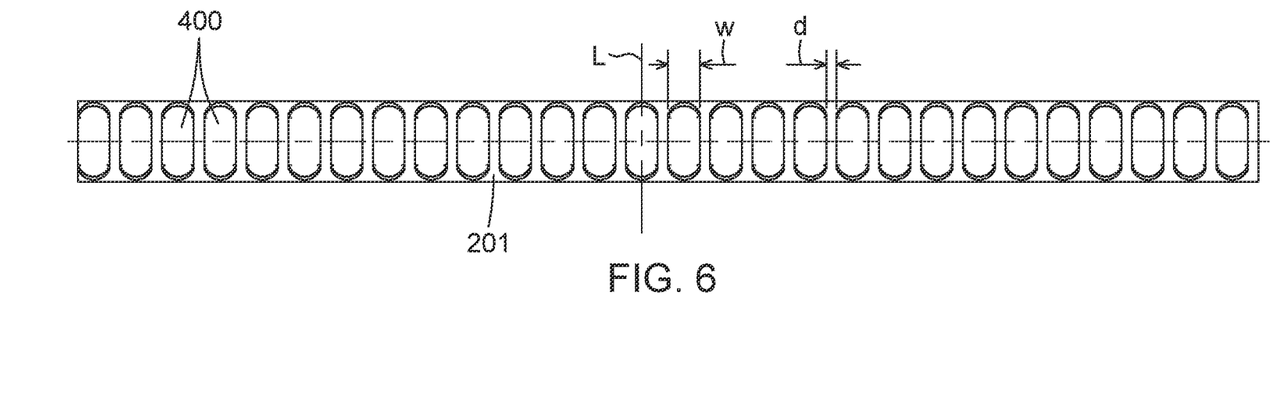
FIG. 6 is a top plan view of a wear liner mat forming at least partially the roller wear liner of FIG. 3, wherein the plurality of inserts is arranged on the wear liner mat.

As best shown in FIG. 6, a distance d between adjacent inserts 400 is smaller than the width W of the inserts 400. For the instance, the distance d is smaller than about 90% of the width W of the insert 400. In another embodiment, the distance d is smaller than about 50% of the width W of the insert 400. In yet another embodiment, the distance d is smaller than about 30% of the width W of the insert 400. For instance, the distance d between adjacent inserts is comprised between about 1 mm and about 10 mm. In another embodiment, the distance d is comprised between about 3 mm and about 8 mm. In yet another embodiment, the distance d is comprised between about 4 mm and about 6 mm.

In the embodiment shown, the distance d between adjacent inserts is substantially similar along a perimeter of the roller wear liner 200.

It is appreciated that the relative arrangement of the inserts with respect to the shock-absorbing matrix, as well as the number and the shape of the inserts, can vary from the embodiment shown.

For instance, the present disclosure is not limited to a roller wear liner comprising a single row of the insert extending along the perimeter thereof: it could also be conceived, as represented in FIG. 11, an embodiment wherein two or more rows of inserts 1400 would extend along the perimeter of the roller wear liner.

Possible Dimensions of the Wear Liner

As best shown in FIGS. 3 and 4, the ring-shaped roller wear liner 200 has an outer diameter do and an inner diameter di. The inner diameter di is smaller than or substantially equal to an outer diameter of the roller cylindrical core 110 for the roller wear liner to snugly fit onto the roller cylindrical core 110. For instance, the roller wear liner 200 is removably superposable against the outer peripheral surface of the belt conveyor roller cylindrical core.

The roller wear liner 200 has a thickness t, defined as a half of the difference between the outer and inner diameters do, di. In the embodiment shown, the inserts 400 extend along at least about 20% of the thickness t of the roller wear liner 200. In another embodiment, the inserts 400 extend along at least about 40% of the thickness t of the roller wear liner 200. In yet another embodiment, the inserts 400 extend along at least about 50% of the thickness t of the roller wear liner 200.

In the embodiment shown, as represented in FIG. 5, the roller wear liner 200 has a width W3, considered along the central axis X of the roller wear liner 200. The width W3 is comprised between about 10 mm and about 100 mm. In another embodiment, the width W3 is comprised between about 20 mm and about 60 mm. In another embodiment, the width W3 is comprised between about 30 mm and about 50 mm. In the embodiment shown, the width W3 is greater than the thickness t of the roller wear liner 200. For instance. For instance, the width W3 is greater than about 150% of the thickness t. In another embodiment, the width W3 is greater than about 200% of the thickness t. In another embodiment, the width W3 is greater than about 250% of the thickness t.

In the embodiment shown, as represented in FIG. 5, the inserts 400 (for instance the inner face 404 thereof) extend along at least about 75% of the width W3 of the roller wear liner 200. In another embodiment, the inserts 400 extend along at least about 85% of the width W3 of the roller wear liner 200. In another embodiment, the inserts 400 extend along at least about 90% of the width W3 of the roller wear liner 200. In yet another embodiment, the inserts 400 extend along substantially an entirety of the width W3 of the roller wear liner 200.

In the embodiment shown, the perimeter of the roller wear liner 200 is comprised between about 20 cm and about 100 cm. In another embodiment, the perimeter of the roller wear liner 200 is comprised between about 40 cm and about 80 cm. In yet another embodiment, the perimeter of the roller wear liner 200 is comprised between about 50 cm and about 70 cm.

Relative Arrangement of the Wear Liners onto the Roller Cylindrical Core

In the embodiment shown, as represented in FIGS. 1 and 2, the belt conveyor roller assembly 100 comprises a plurality (six, in the embodiment shown) of roller wear liners 200 mounted to (for instance in a removable manner) and superposed against the outer peripheral surface 112 of the roller cylindrical core 110. In the embodiment shown, the plurality of roller wear liners 200 are spaced apart from each other, for instance regularly spaced apart from each other.

It is appreciated that the shape, the configuration, and the number of the roller wear liners, as well as the relative arrangement of the roller wear liners onto the outer peripheral surface of the roller cylindrical core can vary from the embodiment shown.

Figure 10:
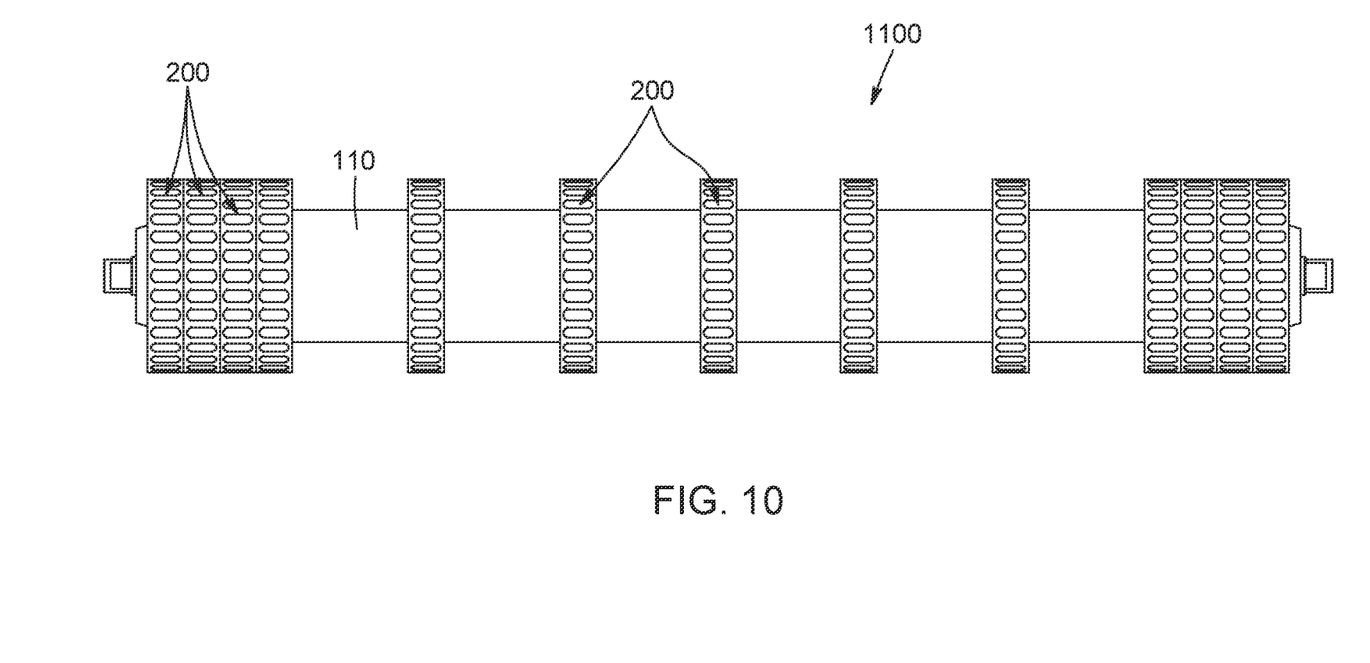
FIG. 10 is a side-elevational view of a belt conveyor roller assembly in accordance with a second embodiment, the bet conveyor roller assembly comprising a plurality of roller wear liners of FIG. 3, some of the roller wear liners being contiguous to each other, some other being spaced apart from each other.

For instance, as represented in FIG. 10, it could be conceived a belt conveyor roller assembly 1100 comprising a plurality of roller wear liners 200 superposed against the outer peripheral surface of the roller cylindrical body, some of the roller wear liners being immediately adjacent (i.e. contiguous, i.e. contacting) to each other, some other being spaced apart from each other. When the roller wear liners are configured in an adjacent configuration, the inserts thereof can either be substantially aligned with each other (FIG. 10) or could be arranged in a staggered configuration.

Figure 13:
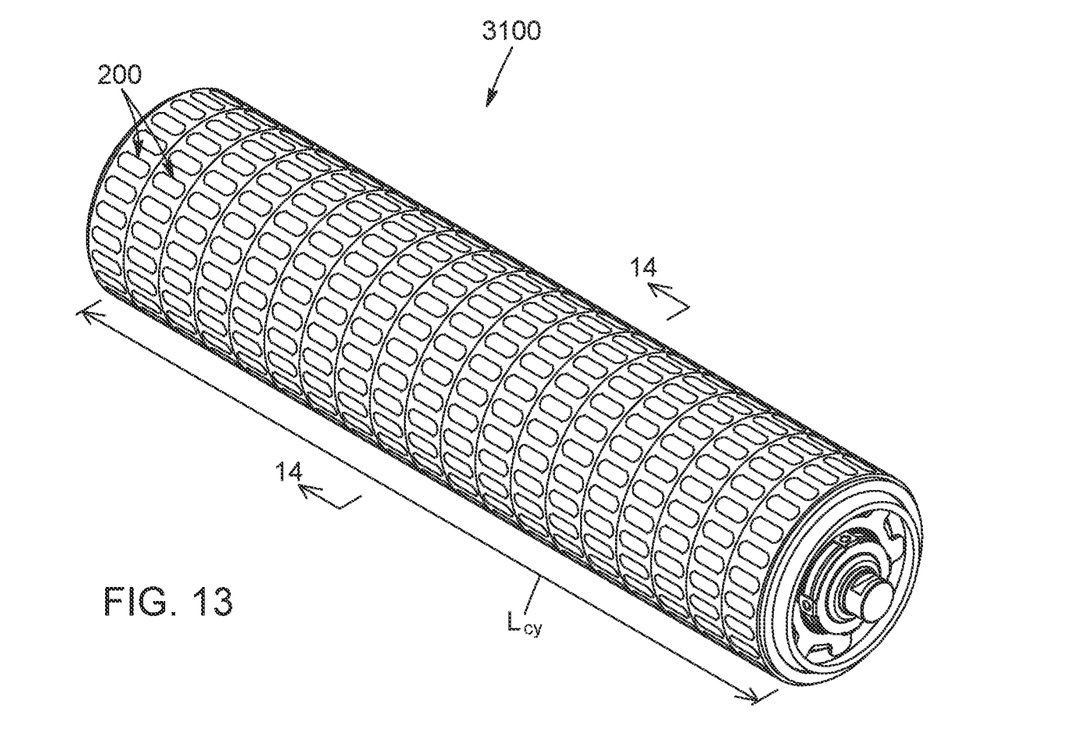
FIG. 13 is a perspective view of a belt conveyor roller assembly in accordance with another embodiment, the belt conveyor roller assembly comprising a plurality of roller wear liners of FIG. 3, the roller wear liners being contiguous to each other and extending along an entirety of a length of the roller cylindrical body.
Figure 14:
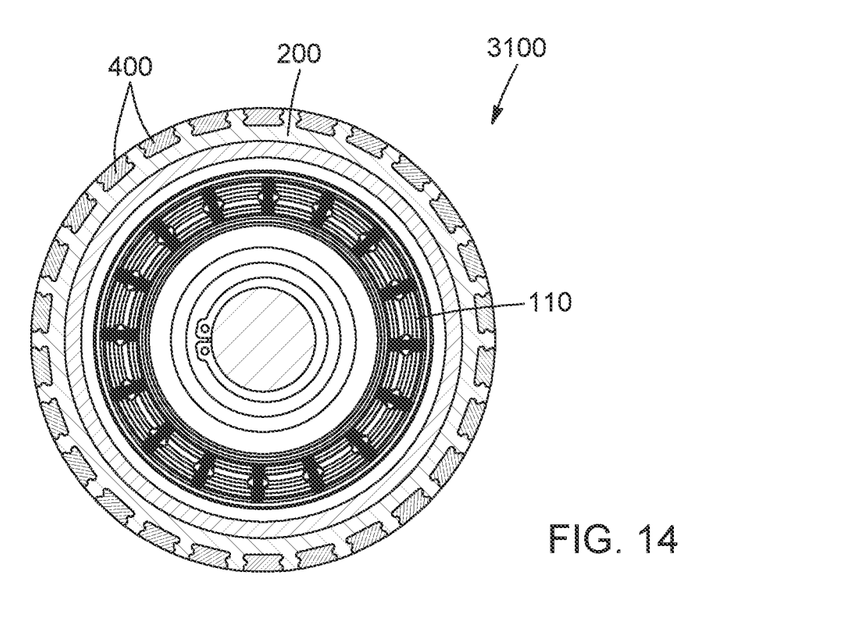
FIG. 14 is a cross-section view of the belt conveyor roller assembly of FIG. 13 taken along cross-section lines 14-14 of FIG. 13.

As represented in FIGS. 13 and 14, it could also be conceived a belt conveyor roller assembly 3100 comprising a plurality of roller wear liners 200 superposed against the outer peripheral surface of the roller cylindrical body. In the embodiment shown, all the roller wear liners are configured in an adjacent configuration (i.e., in a contacting configuration) and the combination of the plurality of the roller wear liners extends substantially along an entirety of the length $L_{cy}$ of the roller cylindrical body 110.

For instance, the width W3 of at least one of the roller wear liners 200 is smaller than about 90% of the length $L_{cy}$ of the roller cylindrical body 110. In another embodiment, the width W3 of at least one of the roller wear liners 200 is smaller than about 50% of the length $L_{cy}$ of the roller cylindrical body 110. In another embodiment, the width W3 of at least one of the roller wear liners 200 is smaller than about 30% of the length $L_{cy}$ of the roller cylindrical body 110. In another embodiment, the width W3 of at least one of the roller wear liners 200 is smaller than about 10% of the length $L_{cy}$ of the roller cylindrical body 110.

In some embodiments, the combination of the plurality of the roller wear liners extends along at least about 20% the length $L_{cy}$ of the roller cylindrical body 110. In another embodiment, the combination of the plurality of the roller wear liners extends along at least about 50% the length $L_{cy}$ of the roller cylindrical body 110. In another embodiment, the combination of the plurality of the roller wear liners extends along at least about 70% the length $L_{cy}$ of the roller cylindrical body 110. In yet another embodiment, the combination of the plurality of the roller wear liners extends along at least about 90% the length $L_{cy}$ of the roller cylindrical body 110.

It could also be conceived a belt conveyor roller assembly which would comprise a plurality of roller wear liners of different types superposed onto the outer peripheral surface of the roller cylindrical core thereof and extending together along at least a portion (for instance along substantially an entirety) of the length Ley of the roller cylindrical body against the outer peripheral surface of which the roller wear liners are superposed.

Benefits of the Wear Liner

The specific shape of the inserts, and more particularly the retention groove formed in the peripheral wall thereof and/or the relative dimensions of the belt-contacting and inner faces thereof, eases the gripping and/or bonding with the shock-absorbing matrix. The risk of inserts being removed from the roller wear liner when in use in a belt conveyor is thus limited.

Moreover, the roller wear liner limits the risk of deteriorating the inner face of the conveying belt by the belt conveyor roller assemblies. In other words, the roller wear liner limits the deterioration of the belt conveyor roller assemblies. It has been noticed that the roller wear liner has better durability than, for instance, steel wear liners. The risk of deteriorating the inner face of the conveying belt and/or breaking the belt conveyor when the belt conveyor is stopped is also limited.

In other words, the roller wear liners 200 form belt-contacting sleeves (or conveyor-contacting sleeve) surrounding at least partially the roller cylindrical core 110 of the belt conveyor roller assembly 100 so as to form an interface between the inner face of the conveying belt and the roller cylindrical core of the belt conveyor roller assembly.

Method for Manufacturing a Belt Conveyor Roller Wear Liner

According to another aspect of the disclosure, there is provided a method for manufacturing a belt conveyor roller wear liner.

Figure 7:
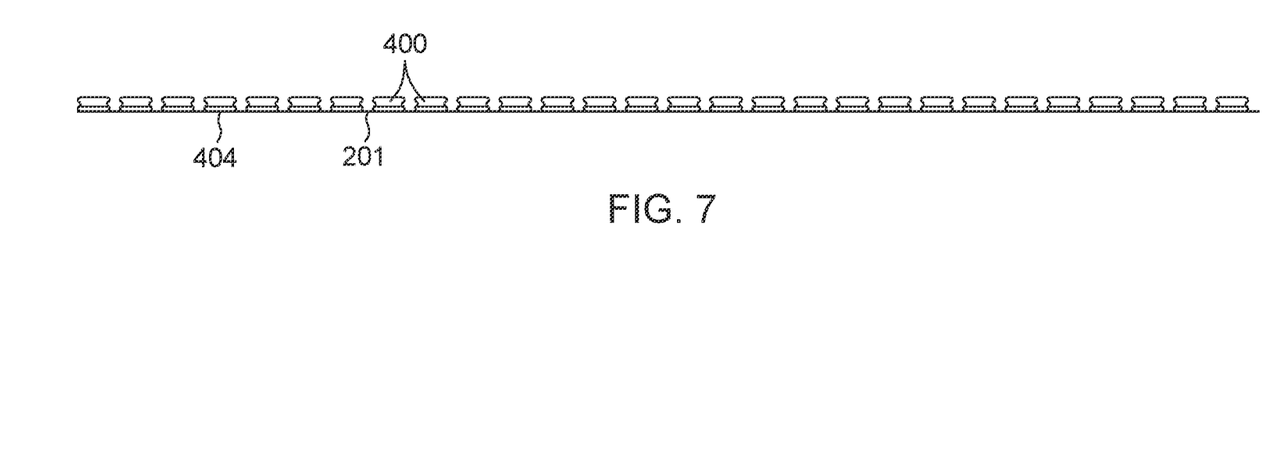
FIG. 7 is a side-elevational view of the wear liner mat of FIG. 6 with the plurality of inserts arranged thereon.

As represented in FIGS. 6 and 7, in the embodiment shown, an insert-mounting mat 201 (or wear liner mat 201) is provided (for instance at least partially made of nylon) and a plurality of inserts 400 are secured (for instance glued) to a face of the insert-mounting mat 201. In the embodiment shown, the inner faces 404 of the inserts 400 are secured to the insert-mounting mat 201.

Then the insert-mounting mat 201 with the inserts 400 mounted thereto is placed in a mold, for injecting a shock-absorbing material (for instance a polymeric-based material), so as to form the shock-absorbing matrix 300 embedding the inserts 400. For instance, an additional mat could be used to ensure that the insert-mounting mat 201 with the inserts 400 mounted thereto is properly placed in the mold and maintained therein when the shock-absorbing material is injected.

Several alternative embodiments and examples have been described and illustrated herein. The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind. The scope of the invention is therefore intended to be limited by the scope of the appended claims.

The invention claimed is:

1. A belt conveyor roller wear liner superposable against an outer peripheral surface of a belt conveyor roller cylindrical body, the roller wear liner comprising:
   a shock-absorbing matrix having a belt-facing face; and
   a plurality of inserts embedded in the shock-absorbing matrix and spaced-apart from one another, at least one of said plurality of inserts comprising:
   a belt-contacting face;
   an opposed inner face;
   wherein the belt-contacting face of said at least one of said plurality of inserts and the belt-facing face of the shock-absorbing matrix define together a substantially continuous belt-contacting surface of the roller wear liner; and wherein said at least one of said plurality of inserts has a perimeter and comprises a peripheral wall extending between the belt-contacting face and the inner face, a retention groove being formed in the peripheral wall and extending along at least a portion of the perimeter.

2. The roller wear liner according to claim 1, wherein the belt-contacting and inner faces of said at least one of the said plurality of inserts are substantially parallel to each other.

3. The roller wear liner according to claim 1, wherein at least one of the belt-contacting face and the inner face of said at least one of the said plurality of inserts has a substantially oval shape.

4. The roller wear liner according to claim 1, wherein a surface area of the belt-contacting face of said at least one of said plurality of inserts is smaller than or equal to a surface area of the corresponding inner face.

5. The roller wear liner according to claim 1, wherein the retention groove defines a concavity in the peripheral wall.

6. The roller wear liner according to claim 1, wherein the retention groove extends along an entirety of the perimeter.

7. The roller wear liner according to claim 1, wherein at least one of said plurality of inserts is at least partially made of a material comprising more than about 50% of $Al_2O_3$.

8. The roller wear liner according to claim 1, wherein at least one of the plurality of inserts is made in an insert material having an insert hardness and the shock-absorbing matrix is made in a matrix material having a matrix hardness, the insert hardness being smaller than the matrix hardness.

9. The roller wear liner according to claim 1, the roller wear liner defining a thickness, at least one of the plurality of inserts extending along at least about 20% of the thickness of the roller wear liner.

10. The roller wear liner according to claim 1, wherein the roller wear liner is substantially ring-shaped.

11. A belt conveyor roller assembly, comprising:
a roller cylindrical body having an outer peripheral surface; and
the roller wear liner according to claim 1, said roller wear liner being superposed against the outer peripheral surface of the roller cylindrical body.

12. A belt conveyor, comprising:
a conveying belt; and
a plurality of rollers surrounded by the conveying belt, wherein at least one of the plurality of rollers comprises one or more of the roller wear liner according to claim 1.

13. A belt conveyor roller wear liner superposable against an outer peripheral surface of a roller cylindrical body, the roller wear liner comprising:
a shock-absorbing matrix having a belt-facing face; and
a plurality of inserts, spaced-apart from one another and embedded in the shock-absorbing matrix, each of the plurality of inserts having a belt-contacting face;

wherein the belt-contacting faces of the plurality of inserts and the belt-facing face of the shock-absorbing matrix form together a substantially continuous belt-contacting surface of the roller wear liner; and wherein the roller wear liner is substantially ring-shaped and extends partially along less than about 50% of a length of the roller cylindrical body when superposed against the outer peripheral surface of the roller cylindrical body.

14. The roller wear liner according to claim 13, wherein at least one of the plurality of inserts is made in an insert material having an insert hardness and wherein the roller wear liner is for a belt conveyor conveying a material, the insert hardness being greater than a hardness of the conveyed material.

15. The roller wear liner according to claim 13, wherein at least one of said plurality of inserts is at least partially made of a material comprising more than about 50% of $Al_2O_3$ and wherein the shock-absorbing matrix is at least partially formed of a polymeric-based material.

16. The roller wear liner according to claim 13, wherein the matrix is made in a matrix material having a matrix harness and wherein at least one of the plurality of inserts is made in an insert material having an insert hardness smaller than the matrix hardness.

17. The roller wear liner according to claim 13, wherein each of said plurality of inserts comprises an inner face opposed to the corresponding belt-contacting face, wherein a surface area of the belt-contacting face of each of said plurality of inserts is smaller than or equal to a surface area of the corresponding inner face.

18. A belt conveyor roller assembly, comprising:
a roller cylindrical body having an outer peripheral surface; and
at least two roller wear liners according to claim 13, said roller wear liners being superposed against the outer peripheral surface of the roller cylindrical body.

19. The belt conveyor roller assembly according to claim 18, wherein said at least two roller wear liners extend together substantially along an entirety of the length of the roller cylindrical body.

20. A method for manufacturing a belt conveyor roller wear liner, comprising:
providing a wear liner mat and a plurality of inserts, each of the plurality of inserts comprising a belt-contacting face and an opposed inner face;
securing the inner faces of the plurality of inserts to the wear liner mat, the plurality of inserts being spaced apart from each other;
placing the wear liner mat with the plurality of inserts secured thereto in a mold; and
injecting a shock-absorbing material in the mold to form the roller wear liner comprising a shock-absorbing matrix embedding the plurality of spaced-apart inserts;
wherein the belt-contacting faces of the plurality of inserts are exposed outwardly when the roller wear liner is removed from the mold.

* * * * *